United States Patent
Pani et al.

(10) Patent No.: US 10,819,563 B2
(45) Date of Patent: Oct. 27, 2020

(54) RECOVERING FROM VIRTUAL PORT CHANNEL PEER FAILURE

(71) Applicant: Cisco Technology, Inc., San Jose, CA (US)

(72) Inventors: Ayaskant Pani, Fremont, CA (US); Saurabh Agarwal, Santa Clara, CA (US); Srinivas Tatikonda, Fremont, CA (US); Sarat Kamisetty, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 177 days.

(21) Appl. No.: 16/173,116

(22) Filed: Oct. 29, 2018

(65) Prior Publication Data
US 2019/0334762 A1 Oct. 31, 2019

Related U.S. Application Data

(63) Continuation of application No. 14/550,844, filed on Nov. 21, 2014, now Pat. No. 10,116,493.

(51) Int. Cl.
*H04L 12/24* (2006.01)
*H04L 12/709* (2013.01)
(Continued)

(52) U.S. Cl.
CPC .......... *H04L 41/0668* (2013.01); *H04L 45/22* (2013.01); *H04L 45/245* (2013.01);
(Continued)

(58) Field of Classification Search
CPC ... H04L 41/0668; H04L 45/22; H04L 45/245; H04L 45/28; H04L 45/586
See application file for complete search history.

(56) References Cited

U.S. PATENT DOCUMENTS 4,298,770 A 11/1981 Nishihara et al.
4,636,919 A 1/1987 Itakura et al.
(Continued)

FOREIGN PATENT DOCUMENTS

CN 103141148 A 6/2013
CN 103297552 9/2013
(Continued)

OTHER PUBLICATIONS

International Search Report and Written Opinion from the International Searching Authority, dated Feb. 10, 2016, 13 pages, for the corresponding International Application PCT/US2015/061429.
(Continued)

*Primary Examiner* — Siming Liu
(74) *Attorney, Agent, or Firm* — Polsinelli PC

(57) ABSTRACT

Systems, methods, and non-transitory computer-readable storage media for recovering from a partial failure of a virtual port chain (vPC) domain. The first and second vPC peers may be paired to create a vPC having a virtual address. An endpoint host may communicate with a network via the virtual port channel. The system may detect that the first virtual port channel peer is down. During or after the first vPC reboots, the reachability cost for the first vPC with regards to the virtual address can be set to an inflated value. The first vPC peer may also delay its bring up time while it synchronizes its vPC state information with the second vPC peer. The second vPC can continue to advertise the association between the endpoint host and the virtual address. Upon completion of the synchronization, the first vPC peer may bring up the link and restore the reachability cost.

20 Claims, 11 Drawing Sheets

(51) Int. Cl.
*H04L 12/703* (2013.01)
*H04L 12/707* (2013.01)
*H04L 12/713* (2013.01)
*H04L 12/937* (2013.01)
*H04L 12/721* (2013.01)

(52) U.S. Cl.
CPC ............ *H04L 45/28* (2013.01); *H04L 45/586* (2013.01); *H04L 49/254* (2013.01); *H04L 45/12* (2013.01); *Y02D 50/30* (2018.01)

(56) References Cited

U.S. PATENT DOCUMENTS

| | | |
|---|---|---|
| 4,700,016 A | 10/1987 | Hitchcock et al. |
| 5,859,835 A | 1/1999 | Varma et al. |
| 5,926,458 A | 1/1999 | Yin |
| 5,983,278 A | 11/1999 | Chong et al. |
| 6,230,231 B1 | 5/2001 | Delong et al. |
| 6,330,614 B1 | 12/2001 | Aggarwal et al. |
| 6,389,031 B1 | 5/2002 | Chao et al. |
| 6,677,831 B1 | 1/2004 | Cheng et al. |
| 6,714,553 B1 | 3/2004 | Poole et al. |
| 6,757,897 B1 | 6/2004 | Shi et al. |
| 6,769,033 B1 | 7/2004 | Bass et al. |
| 6,834,139 B1 | 12/2004 | Prairie et al. |
| 6,876,952 B1 | 4/2005 | Kappler et al. |
| 6,907,039 B2 | 6/2005 | Shen |
| 6,941,649 B2 | 9/2005 | Goergen et al. |
| 6,952,421 B1 | 10/2005 | Slater |
| 6,954,463 B1 | 10/2005 | Ma et al. |
| 6,996,099 B1 | 2/2006 | Kadambi et al. |
| 7,068,667 B2 | 6/2006 | Foster et al. |
| 7,152,117 B1 | 12/2006 | Stapp et al. |
| 7,177,946 B1 | 2/2007 | Kaluve et al. |
| 7,181,530 B1 | 2/2007 | Halasz et al. |
| 7,216,161 B1 | 5/2007 | Peckham et al. |
| 7,336,670 B1 | 2/2008 | Calhoun et al. |
| 7,372,857 B1 | 5/2008 | Kappler et al. |
| 7,379,459 B2 | 5/2008 | Ohnishi |
| 7,411,915 B1 | 8/2008 | Spain et al. |
| 7,426,604 B1 | 9/2008 | Rygh et al. |
| 7,463,590 B2 | 12/2008 | Mualem et al. |
| 7,630,368 B2 | 12/2009 | Tripathi et al. |
| 7,729,296 B1 | 6/2010 | Choudhary et al. |
| 7,735,114 B2 | 6/2010 | Kwan et al. |
| 7,738,377 B1 | 6/2010 | Agostino et al. |
| 7,742,406 B1 | 6/2010 | Muppala |
| 7,826,469 B1 | 11/2010 | Li et al. |
| 7,852,748 B2 | 12/2010 | Le Faucheur et al. |
| 7,940,763 B1 | 5/2011 | Kastenholz |
| 8,028,160 B1 | 9/2011 | Orr |
| 8,170,025 B2 | 5/2012 | Kloth et al. |
| 8,190,843 B1 | 5/2012 | De Forest et al. |
| 8,195,736 B2 | 6/2012 | Malloy et al. |
| 8,243,746 B2 | 8/2012 | Di Benedetto |
| 8,302,301 B2 | 11/2012 | Lau |
| 8,325,459 B2 | 12/2012 | Mutnury et al. |
| 8,339,973 B1 | 12/2012 | Pichumani et al. |
| 8,369,335 B2 | 2/2013 | Jha et al. |
| 8,411,688 B2 | 4/2013 | Farkas et al. |
| 8,423,632 B2 | 4/2013 | Yin et al. |
| 8,509,087 B2 | 8/2013 | Rajagopalan et al. |
| 8,515,682 B2 | 8/2013 | Buhler et al. |
| 8,605,575 B2 | 12/2013 | Gunukula et al. |
| 8,645,984 B1 | 2/2014 | Beskrovny et al. |
| 8,687,629 B1 | 4/2014 | Kompella et al. |
| 8,752,175 B2 | 6/2014 | Porter |
| 8,868,766 B1 | 10/2014 | Theimer et al. |
| 8,874,876 B2 | 10/2014 | Bhadra et al. |
| 8,934,340 B1 | 1/2015 | Mater et al. |
| 8,995,272 B2 | 3/2015 | Agarwal et al. |
| 9,031,959 B2 | 5/2015 | Liu |
| 9,053,070 B1 | 6/2015 | Arguelles |
| 9,197,553 B2 | 11/2015 | Jain et al. |
| 9,203,188 B1 | 12/2015 | Siechen et al. |
| 9,203,753 B2 | 12/2015 | Leung et al. |
| 9,241,005 B1 | 1/2016 | Orr |
| 9,258,195 B1 | 2/2016 | Pendleton et al. |
| 9,274,710 B1 | 3/2016 | Oikarinen et al. |
| 9,356,942 B1 | 5/2016 | Joffe |
| 9,374,294 B1 | 6/2016 | Pani |
| 9,402,470 B2 | 8/2016 | Shen et al. |
| 9,407,501 B2 | 8/2016 | Yadav et al. |
| 9,414,224 B1 | 8/2016 | Schmidt et al. |
| 9,433,081 B1 | 8/2016 | Xiong et al. |
| 9,444,634 B2 | 9/2016 | Pani et al. |
| 9,502,111 B2 | 11/2016 | Dharmapurikar et al. |
| 9,509,092 B2 | 11/2016 | Shen et al. |
| 9,565,202 B1 | 2/2017 | Kindlund et al. |
| 9,590,914 B2 | 3/2017 | Alizadeh Attar et al. |
| 9,602,424 B1 | 3/2017 | Vincent et al. |
| 9,627,063 B2 | 4/2017 | Dharmapurikar et al. |
| 9,634,846 B2 | 4/2017 | Pani |
| 9,635,937 B2 | 5/2017 | Shen et al. |
| 9,654,300 B2 | 5/2017 | Pani |
| 9,654,385 B2 | 5/2017 | Chu et al. |
| 9,654,409 B2 | 5/2017 | Yadav et al. |
| 9,655,232 B2 | 5/2017 | Saxena et al. |
| 9,667,431 B2 | 5/2017 | Pani |
| 9,667,551 B2 | 5/2017 | Edsall et al. |
| 9,669,459 B2 | 6/2017 | Guthrie et al. |
| 9,674,086 B2 | 6/2017 | Ma et al. |
| 9,686,180 B2 | 6/2017 | Chu et al. |
| 9,698,994 B2 | 7/2017 | Pani |
| 9,710,407 B2 | 7/2017 | Oikarinen et al. |
| 9,716,665 B2 | 7/2017 | Alizadeh Attar et al. |
| 9,729,387 B2 | 8/2017 | Agarwal et al. |
| 9,742,673 B2 | 8/2017 | Banerjee et al. |
| 9,755,965 B1 | 9/2017 | Yadav et al. |
| 9,544,224 B2 | 10/2017 | Chu et al. |
| 9,806,995 B2 | 10/2017 | Chu et al. |
| 9,825,857 B2 | 11/2017 | Banerjee et al. |
| 9,832,122 B2 | 11/2017 | Dharmapurikar et al. |
| 9,838,248 B1 | 12/2017 | Grammel et al. |
| 9,876,711 B2 | 1/2018 | Chu et al. |
| 2002/0124107 A1 | 9/2002 | Goodwin |
| 2002/0126671 A1 | 9/2002 | Ellis et al. |
| 2002/0146026 A1 | 10/2002 | Unitt et al. |
| 2003/0035385 A1 | 2/2003 | Walsh et al. |
| 2003/0067924 A1 | 4/2003 | Choe et al. |
| 2003/0097461 A1 | 5/2003 | Barham et al. |
| 2003/0115319 A1 | 6/2003 | Dawson et al. |
| 2003/0123462 A1 | 7/2003 | Kusayanagi |
| 2003/0137940 A1 | 7/2003 | Schwartz et al. |
| 2003/0174650 A1 | 9/2003 | Shankar et al. |
| 2003/0231646 A1 | 12/2003 | Chandra et al. |
| 2004/0062259 A1 | 4/2004 | Jeffries et al. |
| 2004/0073715 A1 | 4/2004 | Folkes et al. |
| 2004/0085974 A1 | 5/2004 | Mies et al. |
| 2004/0100901 A1 | 5/2004 | Bellows |
| 2004/0103310 A1 | 5/2004 | Sobel et al. |
| 2004/0160956 A1 | 8/2004 | Hardy et al. |
| 2004/0249960 A1 | 12/2004 | Hardy et al. |
| 2005/0002386 A1 | 1/2005 | Shiragaki |
| 2005/0007961 A1 | 1/2005 | Scott et al. |
| 2005/0013280 A1 | 1/2005 | Buddhikot et al. |
| 2005/0083933 A1 | 4/2005 | Fine et al. |
| 2005/0114541 A1 | 5/2005 | Ghetie et al. |
| 2005/0144290 A1 | 6/2005 | Mallal et al. |
| 2005/0175020 A1 | 8/2005 | Park et al. |
| 2005/0207410 A1 | 9/2005 | Adhikari et al. |
| 2005/0281392 A1 | 12/2005 | Weeks et al. |
| 2006/0028285 A1 | 2/2006 | Jang et al. |
| 2006/0031643 A1 | 2/2006 | Figueira |
| 2006/0078120 A1 | 4/2006 | Mahendran et al. |
| 2006/0123481 A1 | 6/2006 | Bhatnagar et al. |
| 2006/0183488 A1 | 8/2006 | Billhartz |
| 2006/0198315 A1 | 9/2006 | Sasagawa et al. |
| 2006/0200862 A1 | 9/2006 | Olson et al. |
| 2006/0209688 A1 | 9/2006 | Tsuge et al. |
| 2006/0221835 A1 | 10/2006 | Sweeney et al. |
| 2006/0250982 A1 | 11/2006 | Yuan et al. |
| 2006/0268742 A1 | 11/2006 | Chu et al. |
| 2006/0280179 A1 | 12/2006 | Meier |

(56) References Cited

U.S. PATENT DOCUMENTS

| | | |
|---|---|---|
| 2007/0006211 A1 | 1/2007 | Venkiteswaran |
| 2007/0025241 A1 | 2/2007 | Nadeau et al. |
| 2007/0083913 A1 | 4/2007 | Griffin et al. |
| 2007/0104198 A1 | 5/2007 | Kalluri et al. |
| 2007/0133566 A1 | 6/2007 | Copps |
| 2007/0165627 A1 | 7/2007 | Sultan et al. |
| 2007/0223372 A1 | 9/2007 | Haalen et al. |
| 2007/0274229 A1 | 11/2007 | Scholl et al. |
| 2007/0280264 A1 | 12/2007 | Milton et al. |
| 2008/0031130 A1 | 2/2008 | Raj et al. |
| 2008/0031247 A1 | 2/2008 | Tahara et al. |
| 2008/0092213 A1 | 4/2008 | Wei et al. |
| 2008/0120691 A1 | 5/2008 | Flewallen et al. |
| 2008/0147830 A1 | 6/2008 | Ridgill et al. |
| 2008/0151863 A1 | 6/2008 | Lawrence et al. |
| 2008/0177896 A1 | 7/2008 | Quinn et al. |
| 2008/0196100 A1 | 8/2008 | Madhavan et al. |
| 2008/0196102 A1 | 8/2008 | Roesch |
| 2008/0225853 A1 | 9/2008 | Melman et al. |
| 2008/0243495 A1 | 10/2008 | Anandakumar et al. |
| 2008/0253366 A1 | 10/2008 | Zuk et al. |
| 2008/0253556 A1 | 10/2008 | Cobb et al. |
| 2008/0263665 A1 | 10/2008 | Ma et al. |
| 2008/0298330 A1 | 12/2008 | Leitch |
| 2008/0298360 A1 | 12/2008 | Wijnands et al. |
| 2008/0310421 A1 | 12/2008 | Teisberg et al. |
| 2009/0010153 A1 | 1/2009 | Filsfils et al. |
| 2009/0044005 A1 | 2/2009 | Komura et al. |
| 2009/0086629 A1 | 4/2009 | Zhang et al. |
| 2009/0094357 A1 | 4/2009 | Keohane et al. |
| 2009/0103566 A1 | 4/2009 | Kloth et al. |
| 2009/0106838 A1 | 4/2009 | Clark et al. |
| 2009/0122805 A1 | 5/2009 | Epps et al. |
| 2009/0144680 A1 | 6/2009 | Lehavot et al. |
| 2009/0188711 A1 | 7/2009 | Ahmad |
| 2009/0193103 A1 | 7/2009 | Small et al. |
| 2009/0232011 A1 | 9/2009 | Li et al. |
| 2009/0238179 A1 | 9/2009 | Samprathi |
| 2009/0249096 A1 | 10/2009 | Conner et al. |
| 2009/0268614 A1 | 10/2009 | Tay et al. |
| 2009/0268617 A1 | 10/2009 | Wei et al. |
| 2010/0128619 A1 | 5/2010 | Shigei |
| 2010/0150155 A1 | 6/2010 | Napierala |
| 2010/0191813 A1 | 7/2010 | Gandhewar et al. |
| 2010/0191839 A1 | 7/2010 | Gandhewar et al. |
| 2010/0223655 A1 | 9/2010 | Zheng |
| 2010/0265849 A1 | 10/2010 | Harel |
| 2010/0281155 A1 | 11/2010 | Cipollone et al. |
| 2010/0287227 A1 | 11/2010 | Goel et al. |
| 2010/0290472 A1 | 11/2010 | Raman et al. |
| 2010/0299553 A1 | 11/2010 | Cen |
| 2010/0312875 A1 | 12/2010 | Wilerson et al. |
| 2011/0002339 A1 | 1/2011 | Fok |
| 2011/0007638 A1 | 1/2011 | Xu et al. |
| 2011/0110241 A1 | 5/2011 | Atkinson et al. |
| 2011/0138310 A1 | 6/2011 | Gomez et al. |
| 2011/0153722 A1 | 6/2011 | Choudhary et al. |
| 2011/0158248 A1 | 6/2011 | Vorunganti et al. |
| 2011/0170426 A1 | 7/2011 | Kompella et al. |
| 2011/0173699 A1 | 7/2011 | Figlin et al. |
| 2011/0185073 A1 | 7/2011 | Jagadeeswaran et al. |
| 2011/0203834 A1 | 8/2011 | Yoneya et al. |
| 2011/0211578 A1 | 9/2011 | Zwiebel et al. |
| 2011/0213894 A1 | 9/2011 | Silberstein et al. |
| 2011/0228795 A1 | 9/2011 | Agrawal et al. |
| 2011/0239273 A1 | 9/2011 | Yang et al. |
| 2011/0249682 A1 | 10/2011 | Kean et al. |
| 2011/0268118 A1 | 11/2011 | Schlansker et al. |
| 2011/0273990 A1 | 11/2011 | Rajagopalan et al. |
| 2011/0274053 A1 | 11/2011 | Baik et al. |
| 2011/0286324 A1 | 11/2011 | Bellagamba et al. |
| 2011/0286447 A1 | 11/2011 | Liu |
| 2011/0299406 A1 | 12/2011 | Vobbilisetty et al. |
| 2011/0310738 A1 | 12/2011 | Lee et al. |
| 2011/0321031 A1 | 12/2011 | Dournov et al. |
| 2012/0007688 A1 | 1/2012 | Zhou et al. |
| 2012/0063318 A1 | 3/2012 | Boddu et al. |
| 2012/0102114 A1 | 4/2012 | Dunn et al. |
| 2012/0163164 A1 | 6/2012 | Terry et al. |
| 2012/0163396 A1 | 6/2012 | Cheng et al. |
| 2012/0218896 A1 | 8/2012 | Ygberg et al. |
| 2012/0246307 A1 | 9/2012 | Malloy et al. |
| 2012/0275304 A1 | 11/2012 | Patel et al. |
| 2012/0300787 A1 | 11/2012 | Korger |
| 2012/0311621 A1 | 12/2012 | Foster et al. |
| 2013/0003732 A1 | 1/2013 | Dholakia et al. |
| 2013/0007879 A1 | 1/2013 | Esteban et al. |
| 2013/0019277 A1 | 1/2013 | Chang et al. |
| 2013/0055155 A1 | 2/2013 | Wong et al. |
| 2013/0090014 A1 | 4/2013 | Champion |
| 2013/0097335 A1 | 4/2013 | Jiang et al. |
| 2013/0100810 A1 | 4/2013 | Slothouber |
| 2013/0107889 A1 | 5/2013 | Barabash et al. |
| 2013/0121172 A1 | 5/2013 | Cheng et al. |
| 2013/0122825 A1 | 5/2013 | Deforge et al. |
| 2013/0124708 A1 | 5/2013 | Lee et al. |
| 2013/0155846 A1* | 6/2013 | Ramachandran ....... H04L 49/30 370/225 |
| 2013/0182712 A1 | 7/2013 | Aguayo et al. |
| 2013/0242795 A1 | 9/2013 | Heen et al. |
| 2013/0250951 A1 | 9/2013 | Koganti et al. |
| 2013/0311637 A1 | 11/2013 | Kamath et al. |
| 2013/0311663 A1 | 11/2013 | Kamath et al. |
| 2013/0311991 A1 | 11/2013 | Li et al. |
| 2013/0322258 A1 | 12/2013 | Nedeltchev et al. |
| 2013/0322446 A1 | 12/2013 | Biswas et al. |
| 2013/0322453 A1 | 12/2013 | Allan |
| 2013/0332399 A1 | 12/2013 | Reddy et al. |
| 2013/0332577 A1 | 12/2013 | Nakil et al. |
| 2013/0332602 A1 | 12/2013 | Nakil et al. |
| 2013/0347105 A1 | 12/2013 | Nuemann et al. |
| 2014/0016501 A1 | 1/2014 | Kamath et al. |
| 2014/0047264 A1 | 2/2014 | Wang et al. |
| 2014/0052852 A1 | 2/2014 | Dufour et al. |
| 2014/0056298 A1 | 2/2014 | Vobbilisetty et al. |
| 2014/0064278 A1 | 3/2014 | Santos et al. |
| 2014/0068750 A1 | 3/2014 | Tjahjono et al. |
| 2014/0086253 A1 | 3/2014 | Yong |
| 2014/0105039 A1 | 4/2014 | Mcdysan |
| 2014/0105062 A1 | 4/2014 | Mcdysan et al. |
| 2014/0105216 A1 | 4/2014 | Mcdysan |
| 2014/0146817 A1 | 5/2014 | Zhang |
| 2014/0146824 A1 | 5/2014 | Angst et al. |
| 2014/0201375 A1 | 7/2014 | Beereddy et al. |
| 2014/0219275 A1 | 8/2014 | Allan et al. |
| 2014/0241353 A1 | 8/2014 | Zhang et al. |
| 2014/0244779 A1 | 8/2014 | Roitshtein et al. |
| 2014/0258465 A1 | 9/2014 | Li |
| 2014/0269705 A1 | 9/2014 | Decusatis et al. |
| 2014/0269710 A1 | 9/2014 | Sundaram et al. |
| 2014/0269712 A1 | 9/2014 | Kidambi et al. |
| 2014/0280846 A1 | 9/2014 | Gourlay et al. |
| 2014/0294005 A1 | 10/2014 | Jain et al. |
| 2014/0307744 A1 | 10/2014 | Dunbar et al. |
| 2014/0321277 A1 | 10/2014 | Lynn, Jr. et al. |
| 2014/0334295 A1 | 11/2014 | Guichard et al. |
| 2014/0334304 A1 | 11/2014 | Zang et al. |
| 2014/0334317 A1 | 11/2014 | Atreya et al. |
| 2014/0341029 A1 | 11/2014 | Allan et al. |
| 2014/0372582 A1 | 12/2014 | Ghanwani et al. |
| 2015/0009992 A1 | 1/2015 | Zhang |
| 2015/0058470 A1 | 2/2015 | Duda |
| 2015/0073920 A1 | 3/2015 | Pashkevich et al. |
| 2015/0082418 A1 | 3/2015 | Gu |
| 2015/0092551 A1 | 4/2015 | Moisand et al. |
| 2015/0092593 A1 | 4/2015 | Kompella et al. |
| 2015/0103679 A1 | 4/2015 | Tessmer et al. |
| 2015/0113143 A1 | 4/2015 | Stuart et al. |
| 2015/0124629 A1 | 5/2015 | Pani et al. |
| 2015/0124644 A1 | 5/2015 | Pani |
| 2015/0124806 A1 | 5/2015 | Banerjee et al. |
| 2015/0124823 A1 | 5/2015 | Pani et al. |
| 2015/0124824 A1 | 5/2015 | Edsall et al. |
| 2015/0124833 A1 | 5/2015 | Ma et al. |

(56) References Cited

U.S. PATENT DOCUMENTS

| | | |
|---|---|---|
| 2015/0131445 A1 | 5/2015 | Nie et al. |
| 2015/0133201 A1 | 5/2015 | Szabo et al. |
| 2015/0188769 A1 | 7/2015 | Gu |
| 2015/0188770 A1 | 7/2015 | Naiksatann et al. |
| 2015/0222516 A1 | 8/2015 | Deval et al. |
| 2015/0236900 A1 | 8/2015 | Chung et al. |
| 2015/0249608 A1 | 9/2015 | Zhang et al. |
| 2015/0271104 A1 | 9/2015 | Chikkamath et al. |
| 2015/0280959 A1 | 10/2015 | Vincent |
| 2015/0288709 A1 | 10/2015 | Singhal et al. |
| 2015/0334632 A1 | 11/2015 | Rudolph et al. |
| 2015/0378712 A1 | 12/2015 | Cameron et al. |
| 2015/0378969 A1 | 12/2015 | Powell et al. |
| 2016/0006664 A1 | 1/2016 | Sabato et al. |
| 2016/0080350 A1 | 3/2016 | Chaturvedi et al. |
| 2016/0119204 A1 | 4/2016 | Murasato et al. |
| 2016/0134563 A1 | 5/2016 | Yu et al. |
| 2016/0173511 A1 | 6/2016 | Bratspiess et al. |
| 2016/0205069 A1 | 7/2016 | Blocher et al. |
| 2016/0255118 A1 | 9/2016 | Wang |
| 2016/0315811 A1 | 10/2016 | Yadav et al. |
| 2017/0034161 A1 | 2/2017 | Isola et al. |
| 2017/0104636 A1 | 4/2017 | Vora et al. |
| 2017/0111360 A1 | 4/2017 | Hooda et al. |
| 2017/0126718 A1 | 5/2017 | Baradaran et al. |
| 2017/0142207 A1 | 5/2017 | Gupta et al. |
| 2017/0149637 A1 | 5/2017 | Banikazemi et al. |
| 2017/0163491 A1 | 6/2017 | Tonouchi |
| 2017/0207961 A1 | 7/2017 | Saxena et al. |
| 2017/0214619 A1 | 7/2017 | Chu et al. |
| 2017/0222898 A1 | 8/2017 | Acharya et al. |
| 2017/0237651 A1 | 8/2017 | Pani |
| 2017/0237667 A1 | 8/2017 | Wang |
| 2017/0237678 A1 | 8/2017 | Ma et al. |
| 2017/0250912 A1 | 8/2017 | Chu et al. |
| 2017/0257260 A1 | 9/2017 | Govindan et al. |
| 2017/0288948 A1 | 10/2017 | Singh et al. |
| 2017/0294088 A1 | 10/2017 | Patterson et al. |

FOREIGN PATENT DOCUMENTS

| | | |
|---|---|---|
| CN | 103780467 A | 5/2014 |
| CN | 104639464 | 5/2015 |
| EP | 2621136 | 7/2013 |
| WO | WO 2014/071996 | 5/2014 |

OTHER PUBLICATIONS

Abdo, E., "HOST_ID TCP Options: Implementation &Preliminary Test Results," Network Working Group Internet Draft draft-abdo-hostid-tcpopt-implementation-03, Jul. 16, 2012, 30 pages; http://tools.ietf.org/pdf/draft-abdo-hostid-tcpopt-implementation-03.pdf.

Boucadair, M., et al., "Analysis of Solution Candidates to Reveal a Host Identifier (HOST ID) in Shared Address Deployments," IETF INTAREA WG Internet-Draft draft-ietf-intarea-nat-reveal-analysis-05, Feb. 14, 2013, 22 pages.

Brocade Communications Systems, Inc., "Multi-Chassis Trunking for Resilient and High-Performance Network Architectures," White Paper, vvww_brocade.com, 2010, 8 pages.

Cisco Systems, Inc. "Intermediate System-to-Intermediate System (IS-IS) TLVs, Document ID 5739," updated Aug. 10, 2005, 7 pages.

Cisco Systems, Inc., "Chapter 2: Virtual Port Channel Operations," Cisco Nexus 5000 Series NX-OS Operations Guide, Release 5.0(3)N2(1), Jun. 11, 2012, 18 pages.

Cisco Systems, Inc., "Cisco Nexus 1000V VXLAN Configuration Guide, Release 4.2(1)SV2(2.1), Chapter 1, Information About VXLANs," Jun. 21, 2013, 6 pages.

Cisco Systems, Inc., "Design and Configuration Guide: Best Practices for Virtual Port Channels (vPC) on Cisco Nexus 7000 Series Switches," Revised Aug. 2014, 116 pages.

Cisco, "Cisco Fabric Path for Cisco Nexus 7000 Series Switches," White Paper, Sep. 7, 2011, 44 pages.

Cisco, "Cisco Fabric Path," At-A-Glance, 2010, 2 pages.

Cisco, "Cisco FabricPath Design Guide: Using Fabric Path with an Aggregation and Access Topology," Dec. 2011, 53 pages.

Eastlake, D., et al., "Routing Bridges (RBridges): Adjacency," IETF, RFC 6327, Jul. 2011, 27 pages.

Eastlake, D., et al., "Transparent Interconnection of Lots of Links (TRILL) Use of IS-IS," IETF, RFC 6326, Jul. 2011, 26 pages.

Eastlake, Donald, et al., "RBridges: TRILL Header Options," <draft-ietf-trill-rbridge-options-00.txt>, TRILL Working Group, Internet-Draft, Dec. 24, 2009, 18 pages.

Eastlake, Eastlake, et al., "RBridges: Further TRILL Header Options," <draft-ietf-trill-rbrige-options-06.txt>, TRILL Working Group, Internet Draft, Dec. 1, 2011, 20 pages.

Leiserson, Charles E., "Fat-Trees: Universal Networks for Hardware-Efficient Supercomputing," IEEE Transactions on Computers, vol. c-34, No. 10, Oct. 1985, 10 pages.

Onisick, Joe, "VXLAN Deep Dive," Genesis Framework, Wordpress, Nov. 6, 2012, 8 pages.

Perlman, R., et al., "Routing Bridges (RBridges): Base Protocol Specification," IETF, RFC 6325, Jul. 2011, 100 pages.

Perlman, Radia, et al., "Introduction to TRILL," The Internet Protocol Journal, vol. 14, No. 3, Sep. 2011, 19 pages.

Schaumann, Jan, "L3DSR—Overcoming Layer 2 Limitations of Direct Server Return Load Balancing," NANOG 51, Miami, Jan. 30, 2011, 33 pages.

Spijker, Rick Van't, "Dissertation Module for Master of Science—Mobile and Distributed Computer Networks," Leeds Metropolitan University, May 31, 2010, pp. 1-78.

Touch, J., et al., "Transparent Interconnection of Lots of Links (TRILL): Problem and Applicability Statement," Network Working Group, RFC 5556, May 2009, 18 pages.

VMware, Inc., "VMware Network Virtualization Design Guide, Technical White Paper," Jan. 2013, 25 pages.

Wikipedia®, "X-Forwarded-For," retrieved and printed from Internet Mar. 9, 2018, 4 pages; http://en.wikipedia.org/w/index.php?title=X-Forwarded-For&oldid=542207414.

Yourtchenko, D., et al., "Revealing hosts sharing an IP address using TCP option," Network Working Group Internet Draft draft-wing-nat-reveal-option-03.txt, Dec. 8, 2011, 10 pages.

English translation of the First Office Action and Search Report issued by The State Intellectual Property of People's Republic of China, dated Sep. 10, 2019, 16 pages, for corresponding Chinese Patent Application No. 201580063140.6.

* cited by examiner

RECOVERING FROM VIRTUAL PORT CHANNEL PEER FAILURE

CROSS REFERENCE TO RELATED APPLICATIONS

This application is a continuation of U.S. application Ser. No. 14/550,844, filed on Nov. 21, 2014, which is expressly incorporated by reference herein in its entirety.

TECHNICAL FIELD

The present technology pertains to network switching, and more specifically pertains to virtual port channel peer switches.

BACKGROUND

Virtual port channels (vPCs) allow one to create more resilient layer-2 network topologies based on the principles of link aggregation. vPCs can also provide increased bandwidth by trunking multiple physical links. To create a vPC domain, a couple of vPC peers, also known as vPC switches, are typically joined together to combine the multiple physical links into a single logical link. In order to operate as one logical device, the vPC peers may communicate with each other to exchange data as well as various forms of internal state information to keep synchronized with each other. The resultant vPC domain can provide switching and routing services to any endpoint hosts (i.e., tenants) that may sit behind the vPC such that the endpoints can seamlessly communicate with the rest of the network.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
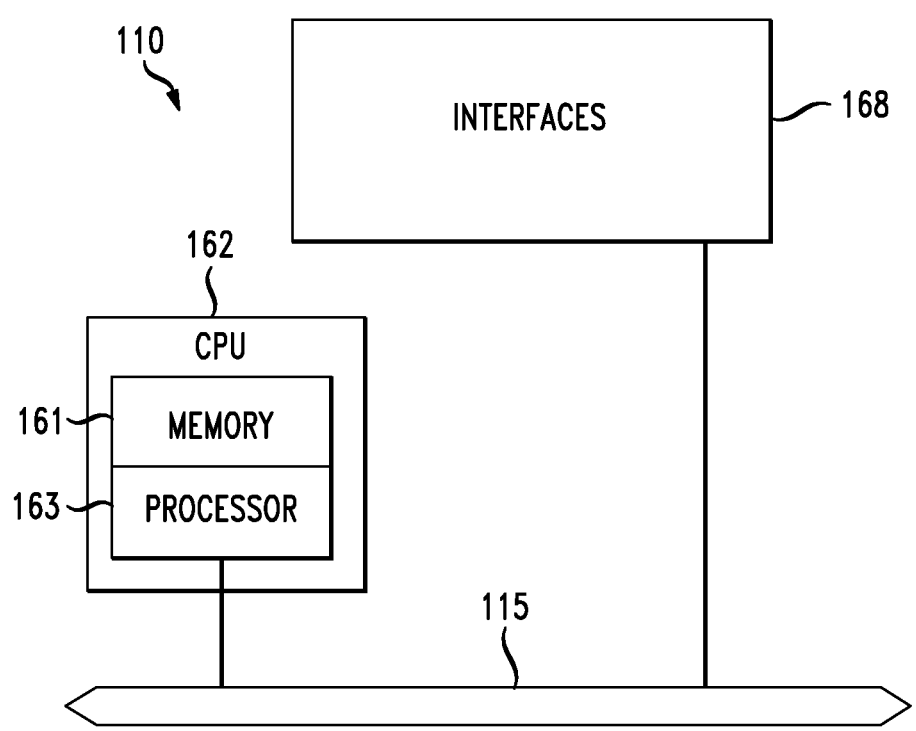
FIG. 1 illustrates an example network device according to some aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

If one of the vPC peers were to fail or require a manual reboot, the tenant traffic drops can be excessive due to the long recovery time for the failed peer. By the time the surviving vPC peer and the rest of the network converge on the failed vPC peer, both incoming and outgoing packets may get lost. Therefore, there is a need in the art to find a way to handle virtual port channel peer failure recovery more graciously, more promptly, and more efficiently.

The improved method and system aims to reduce the convergence window for vPC traffic during vPC switch recovery to a minimum. Instead of withdrawing the virtual IP-to-endpoint bindings upon vPC peer failure, the virtual address (e.g., virtual IP) reachability cost is artificially kept inflated during the vPC peer bring up time. The first vPC peer and the second vPC peer are paired together to create a vPC domain. The vPC domain is associated with a virtual address such as a virtual IP (Internet protocol) address (VIP). One or more endpoint hosts may be behind the VIP and communicate with a network fabric via the vPC domain.

The system may detect that the first virtual port channel peer is down. During or after the first vPC reboots, the reachability cost for the first vPC with regards to the VIP can be set to an inflated value in order to divert the traffic originating from the fabric away from the failed vPC peer (i.e., first vPC peer) and towards the surviving vPC VIP (i.e., second vPC peer). The first vPC peer may also delay its bring up time until it synchronizes its vPC state information with the second vPC peer. The second vPC, in the meantime, can continue to advertise to the fabric that the endpoint hosts are still behind the VIP. Upon completion of the synchronization process, the first vPC peer may bring up the link and restore the reachability cost to start routing and switching packets again.

Description

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

As used herein, the term "failure" in the context of a network device may refer to the device's inability or incapability to reasonably fulfill its specified functions or falling to the state of such incapability. Failure may not necessarily imply that the device has lost all of its functionalities. Thus, a network device may be considered to have failed even when some of its components are still operational as long as the device cannot handle traffic according to its specifications. A device failure can be mechanical, electrical, electronic, and/or logical in nature. A device can fail when it loses electrical power, overloads, suffers from a programming bug, etc. In the context of this disclosure, a device failure may include instances where the device is manually brought down or shut off accidentally or intentionally by a human user, unrelated to inherent flaws in the device or its environment. For example, the system administrator may need to take a network device off the grid to service or upgrade the device. Other terms such as "down," "link down," "inoperable," "nonfunctioning," "inactive," and their variants may also be used interchangeably with "failed" or its variants.

As used herein, the term "boot up time" or "boot time" may refer to a period of time it takes to initialize a device, especially its system components such as the operating system. The term may also refer to the moment in time that such initialization is finished. Devices may require a reboot to recover from a device failure. In such a case, the boot up time or the reboot time may refer to the time it takes for the device to get its system components ready or the moment that they become ready. Booting up a device may not necessarily imply that the device is ready to communicate with other devices or send/receive data packets, as additional components such as a network adapter may need to be initialized and/or internal states may need to be brought up after the boot up. However, broadly speaking, boot up time may also include such additional initialization times and be equated to "bring up time."

As used herein, "bringing up" a network device refers to the act of initializing the hardware and/or software components as well as the necessary data structures and internal state information in the network device such that the device can fully function according to its specified functionality. As such, a network device once brought up may no longer be a failed device. When a vPC peer is brought up, it may be said that its link is up or its route is up. The "bring up time," then, may refer to a duration of time it takes to bring up a network device or the moment in time that such device is brought up. A device may be considered "online" when its communication component(s) such as a network adapter, modem, etc. is operational and the device is able to communicate with a remote device. However, a vPC peer can be online but its link may still not be up. In other words, after a reboot a vPC peer may be able to communicate with its peer device, the endpoint hosts, and/or remote nodes, but the vPC link may not be up due to the fact that the internal states of the two vPC peers may not yet have been synchronized.

The disclosed technology addresses the need in the art for recovering from a vPC peer failure. Disclosed are systems, methods, and computer-readable storage media for reducing the time and resource it takes to recover from a vPC peer failure. A brief introductory description of exemplary systems and networks, as illustrated in FIGS. 1 through 4, is disclosed herein. A detailed description of a vPC domain, vPC peers, related concepts, and exemplary variations, will then follow. These variations shall be described herein as the various embodiments are set forth. The disclosure now turns to FIG. 1.

FIG. 1 illustrates an exemplary network device 110 suitable for implementing the present invention. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such as miscabling detection functions, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the router 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2A:
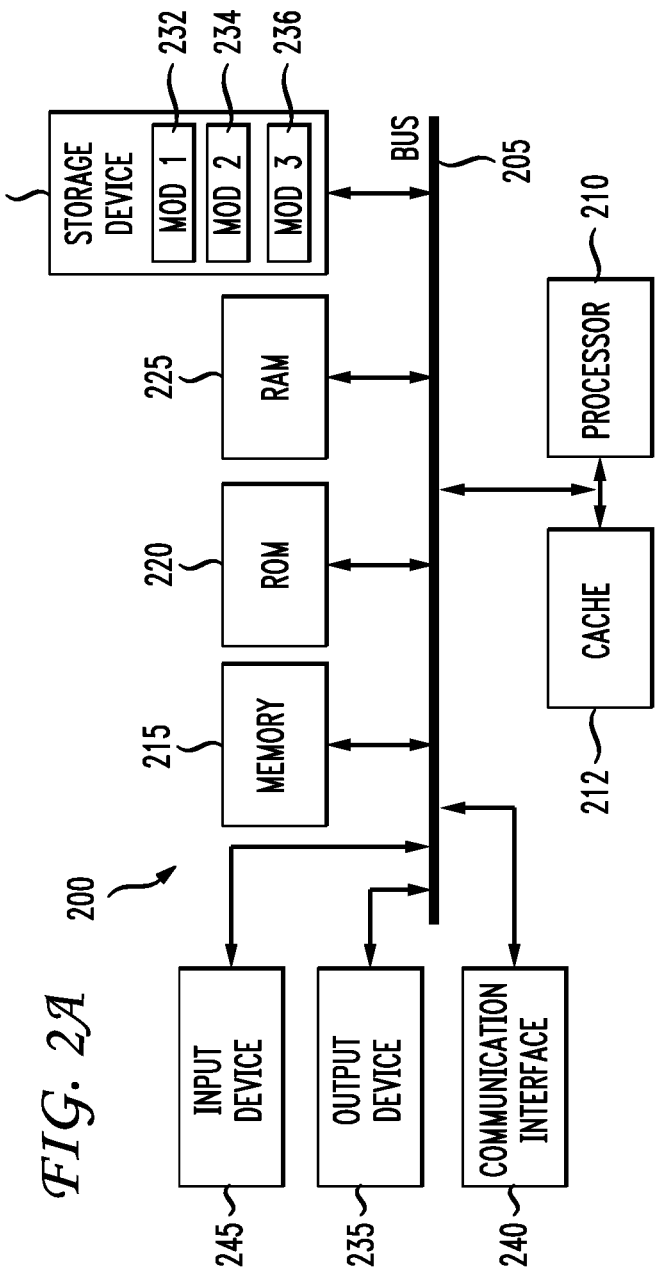
FIGS. 2A and 2B illustrate example system embodiments according to some aspects of the subject technology.
Figure 2B:
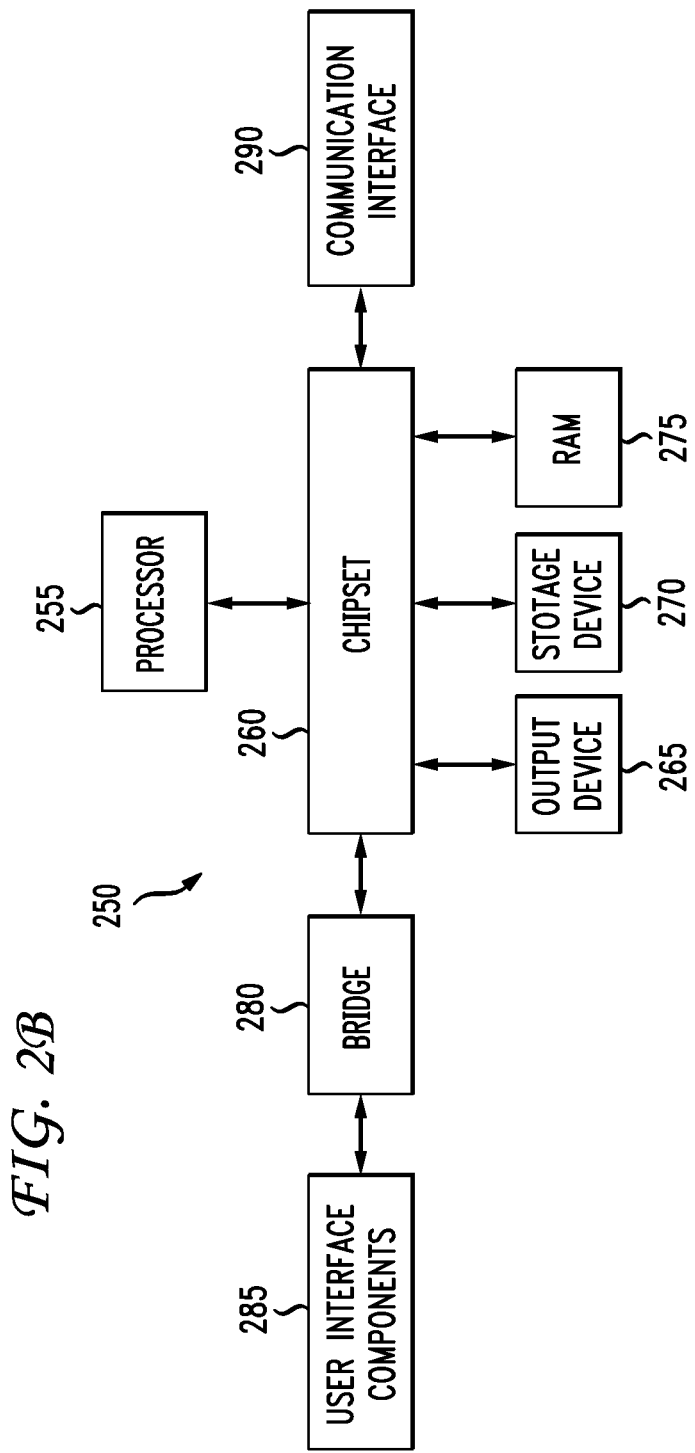

FIG. 2A, and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 (232), module 2 (234), and module 3 (236) stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
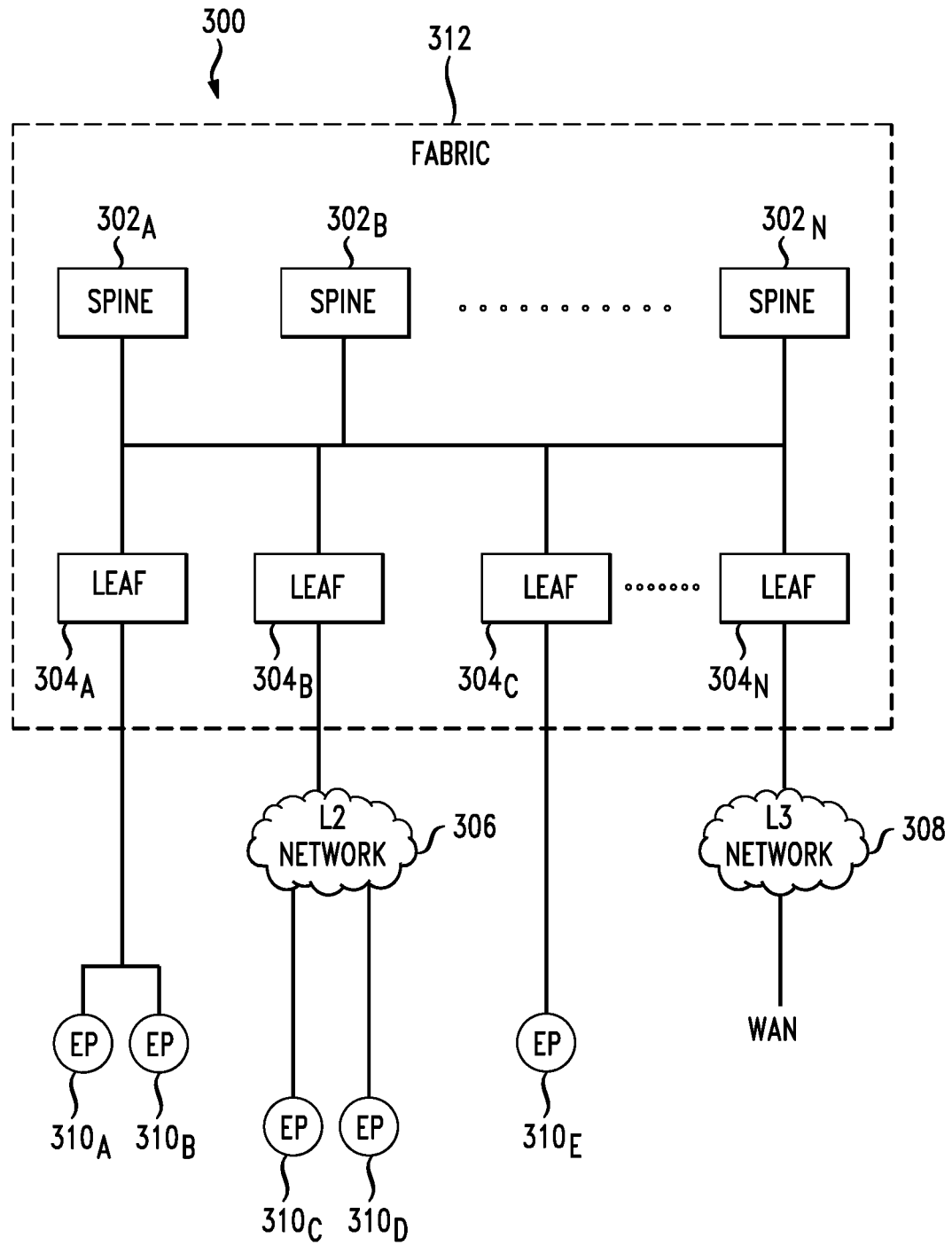
FIG. 3 illustrates a schematic block diagram of an example architecture for a network fabric.

FIG. 3 illustrates a schematic block diagram of an example architecture 300 for network fabric 312. Network fabric 312 can include spine switches $302_A$, $302_B$, ..., $302_N$ (collectively "302") connected to leaf switches $304_A$, $304_B$, $304_C$, ..., $304_N$ (collectively "304") in network fabric 312.

Spine switches 302 can be L3 switches in the fabric 312. However, in some cases, spine switches 302 can also, or otherwise, perform L2 functionalities. Further, spine switches 302 can support various capabilities, such as 40 or 10 Gbps Ethernet speeds. To this end, spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. Spine switches 302 can then perform a lookup of their local mapping database to determine the correct locator address of the packet and forward the packet to the locator address without changing certain fields in the header of the packet.

When a packet is received at spine switch $302_i$, spine switch $302_i$ can first check if the destination locator address is a proxy address. If so, spine switch $302_i$ can perform the proxy function as previously mentioned. If not, spine switch $302_i$ can lookup the locator in its forwarding table and forward the packet accordingly.

Spine switches 302 connect to leaf switches 304 in fabric 312. Leaf switches 304 can include access ports (or non-fabric ports) and fabric ports. Fabric ports can provide uplinks to spine switches 302, while access ports can provide connectivity for devices, hosts, endpoints, VMs, or external networks to fabric 312.

Leaf switches 304 can reside at the edge of fabric 312, and can thus represent the physical network edge. In some cases, leaf switches 304 can be top-of-rack (ToR) switches configured according to a ToR architecture. In other cases, leaf switches 304 can be aggregation switches in any particular topology, such as end-of-row (EoR) or middle-of-row (MoR) topologies. Leaf switches 304 can also represent aggregation switches, for example.

Leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, leaf switches 304 can contain virtual switching functionalities, such as a virtual tunnel endpoint (VTEP) function as explained below in the discussion of VTEP 408 in FIG. 4. To this end, leaf switches 304 can connect fabric 312 to an overlay network, such as overlay network 400 illustrated in FIG. 4.

Network connectivity in fabric 312 can flow through leaf switches 304. Here, leaf switches 304 can provide servers, resources, endpoints, external networks, or VMs access to fabric 312, and can connect the leaf switches 304 to each other. In some cases, the leaf switches 304 can connect EPGs to fabric 312 and/or any external networks. Each EPG can connect to fabric 312 via one of leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to leaf switches 304C or 304D via L3 network 308.

Endpoints 310 can include any communication device, such as a computer, a server, a switch, a router, etc. In some cases, endpoints 310 can include a server, hypervisor, or switch configured with a VTEP functionality which connects an overlay network, such as overlay network 400 below, with fabric 312. For example, in some cases, the endpoints 310 can represent one or more of VTEPs 408A-D illustrated in FIG. 4. Here, VTEPs 408A-D can connect to fabric 312 via leaf switches 304. The overlay network can host physical devices, such as servers, applications, EPGs, virtual segments, virtual workloads, etc. In addition, endpoints 310 can host virtual workload(s), clusters, and applications or services, which can connect with fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
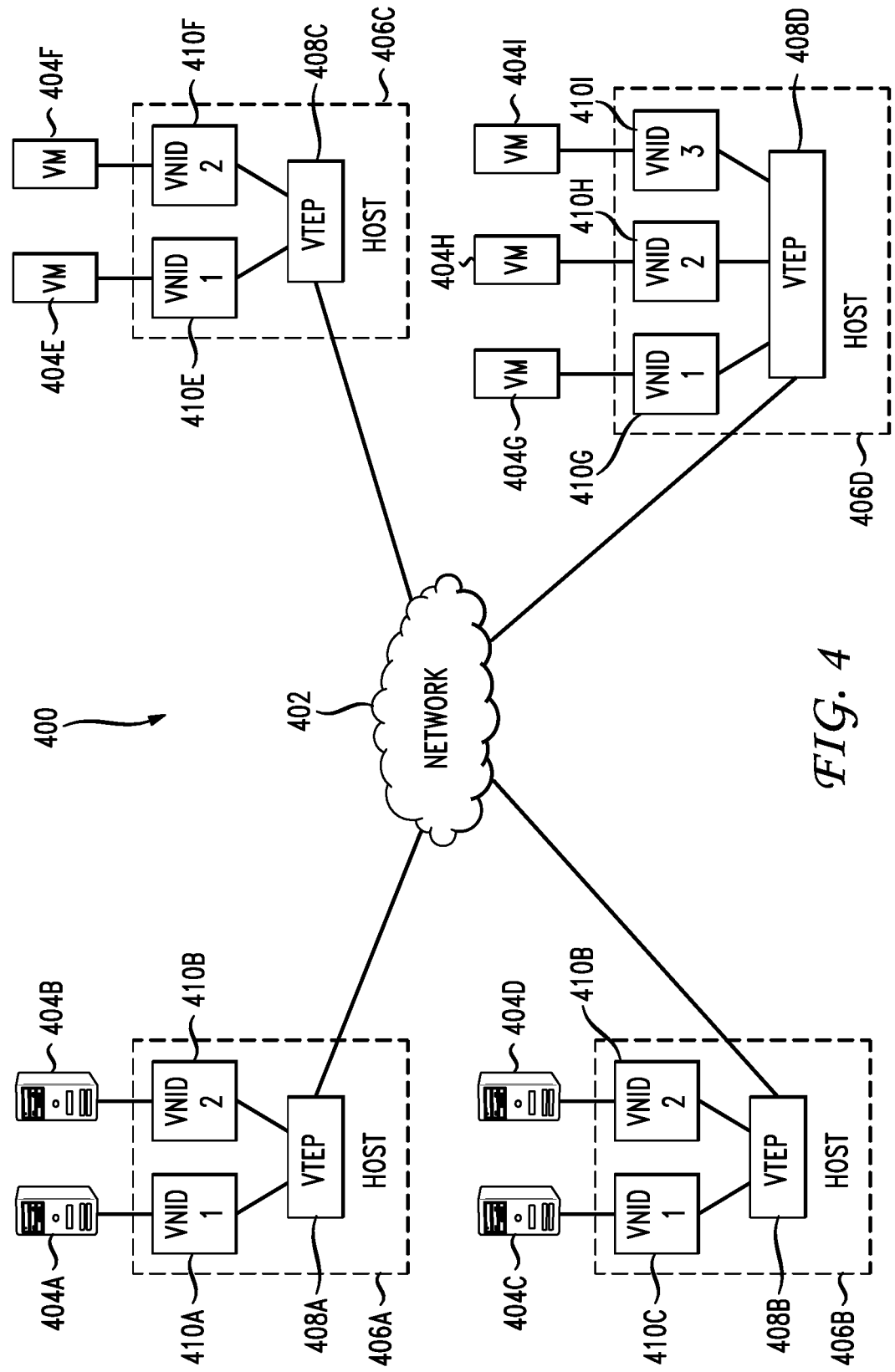
FIG. 4 illustrates an example overlay network.

FIG. 4 illustrates an exemplary overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points. However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 3, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F, H because they all reside in VNID 2. VMs 404E-I can host virtual workloads, which can include application workloads, resources, and services, for example. However, in some cases, servers 404A-D can similarly host virtual workloads through VMs hosted on servers 404A-D. Moreover, each of servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

Figure 5A:
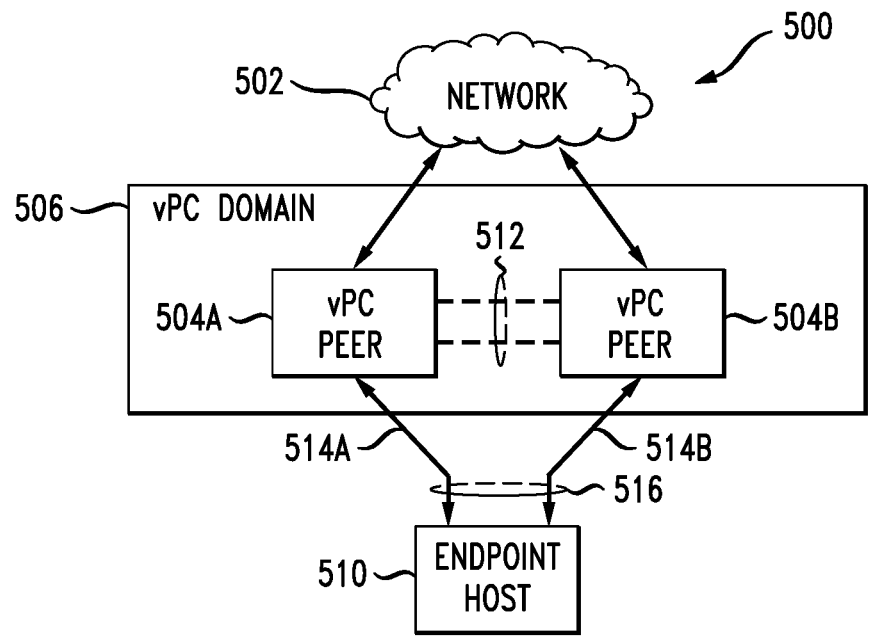
FIG. 5A illustrates a physical topology of an example vPC implementation.

FIG. 5A illustrates a physical topology of an example vPC implementation. In this example vPC implementation 500, vPC peer 504A and vPC peer 504B are joined together to form vPC domain 506 and provide a virtual port channel to endpoint host 510. A port channel (sometimes stylized as "PortChannel") can bundle multiple individual interfaces into a group to provide increased bandwidth and redundancy. Port channeling can also load balance traffic across these physical interfaces. The port channel may stay operational as long as at least one physical interface within the port channel is operational. A virtual port channel (sometimes stylized as "virtual PortChannel" or "vPC") may allow links that are physically connected to two different devices (e.g., switches) to appear as a single port channel to a third device. In other words, vPC may extend link aggregation to two separate physical devices. The link aggregation can be facilitated by using, for example, link aggregation control protocol (LACP). This may allow the creation of resilient L2 topologies based on link aggregation, thereby effectively eliminating the need for the use of spanning tree protocol (STP). vPC may also provide increased bandwidth because all links can actively and simultaneously forward data traffic. Although FIG. 5A shows two vPC peers 504A, 504B (collectively "504") working in tandem to create vPC domain 506, one of skill in the art will understand that vPC domain 506 may be created by using three or more peer switches as well.

Although FIG. 5A shows only one endpoint for vPC peers 504, one of skill in the art will understand that multiple endpoints may be connected to vPC peers 504. vPC peer 504A and vPC 504B may also be connected to network 502, and endpoint host 510 can communicate with network 502 through the vPC jointly provided by vPC peers 504. Network 502 can be a LAN, a WAN, an overlay network, etc. Network 502 may consist of one or more spine nodes, such as spine switches 302 as illustrated in FIG. 3, and vPC peer 504A and vPC peer 504B can be leaf nodes, such as leaf switches 304 as illustrated in FIG. 3. vPC peer 504A and vPC peer 504B can be a network device such as a switch that is configured to physically connect various network devices and perform packet switching to route data packets from one node to another node in the network. Moreover, vPC peers 504 can be a ToR server and/or a VTEP such as VTEP 408 as shown in FIG. 4. As such, vPC peers 504 may have both L2 and L3 functionalities and/or provide L2-to-L3 encapsulation and L3-to-L2 de-encapsulation.

In order for vPC peer 504A and vPC 504B to work in concert, their routing and switching information may need to be in sync. To facilitate this, vPC peers 504 can be connected to each other through dedicated peer-link 512. Peer-link 512 can be a multi-chassis trunking (MCT) link. However, peer-link 512 need not be a dedicated physical link that connects vPC peer 504A directly with vPC peer 504B. For example, peer-link 512 can be a logical link or a connection that is established over a physical overlay network such as an Insieme® fabric. In such embodiment, the fabric itself can serve as peer-link 512. vPC peer 504A and vPC 504B may exchange control plane messages as well as data traffic through peer-link 512. An additional out-of-band mechanism (not shown in FIG. 5A) may be employed to detect peer liveliness in case of peer-link 512 failure. For instance, a routing protocol, such as Intermediate System to Intermediate System (IS-IS) or Open Shortest Path First (OSPF), running in the overlay network can provide liveness/reachability between vPC peers 504.

Endpoint host 510 can be a network device or a network node such as endpoints 310 as illustrated in FIG. 3. As such, endpoint 510 can be a computer, a server, a blade server, a rack server, a top-of-rack (ToR) server, a switch, a router, a hypervisor, a VTEP switch, a virtual machine (VM), etc. Endpoint 510 may interface with vPC domain 506 (i.e., vPC peer 504A and vPC peer 504B) via an L2 communication interface.

vPC domain 506 can be associated with a unique virtual address. The virtual IP address can be an L3 address, such as a virtual IP (VIP) address. As such, vPC peer 504A and vPC peer 504B may both share and host this VIP address. In other words, data packets originating from network 502 and destined for the VIP address may be routed to either vPC peer 504A or vPC peer 504B at any given time. vPC domain 506 may also be associated with an L2 address, such as a media access control (MAC) address. In some aspects, vPC peer 504A and vPC peer 504B may each have a distinct MAC address such that endpoint host 510 can selectively transmit data packets to one or both of the peers.

Figure 5B:
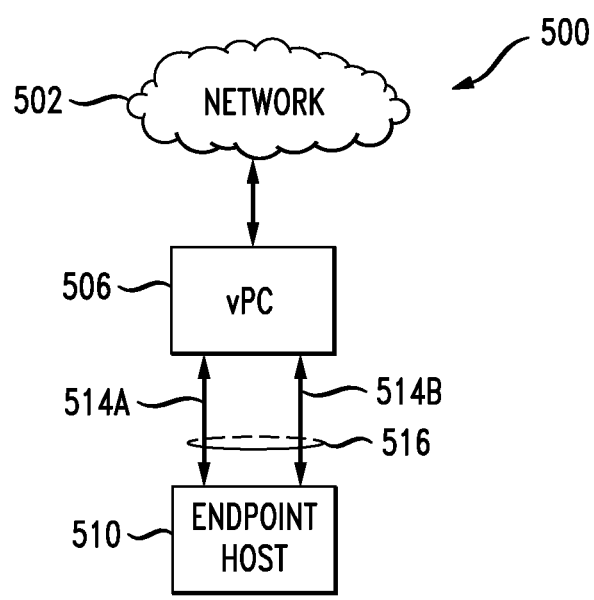
FIG. 5B illustrates a logical topology of an example vPC implementation.

FIG. 5B illustrates a logical topology of an example vPC implementation. In this logical topology of example vPC implementation 500, the two physical peer switches 504 may appear to other devices as a single logical vPC 506. vPC domain 506 may be associated with a VIP address, which can be shared by physical vPC peers 504. vPC domain 506 and/or each individual vPC peer 504 may have a MAC address unique assigned to it. As such, nodes in network 502 may transmit traffic, destined for endpoint 510, towards the VIP address of vPC domain 506, and endpoint 510 may also transmit data traffic, destined for one or more nodes in network 502, towards the MAC address of vPC domain 506. In some aspects, vPC 506 may maintain routing and switching information for handling L2 and L3 traffic. For example, vPC 506 may maintain an overlay address table that provides L3 address mapping. In another example, vPC 506 may maintain a host reachability table that maps L2 addresses of any of the endpoints, including endpoint 510, with appropriate switching information. Such tables may be stored in each of physical vPC peers 504 and synchronized between vPC peers 504 via peer-link 512. The routing and switching information can be made available to endpoint 510 and other devices or nodes in network 502 as well so that those devices may be able to determine which one of the two vPC peers 504 to transmit data packets to.

Figure 6A:
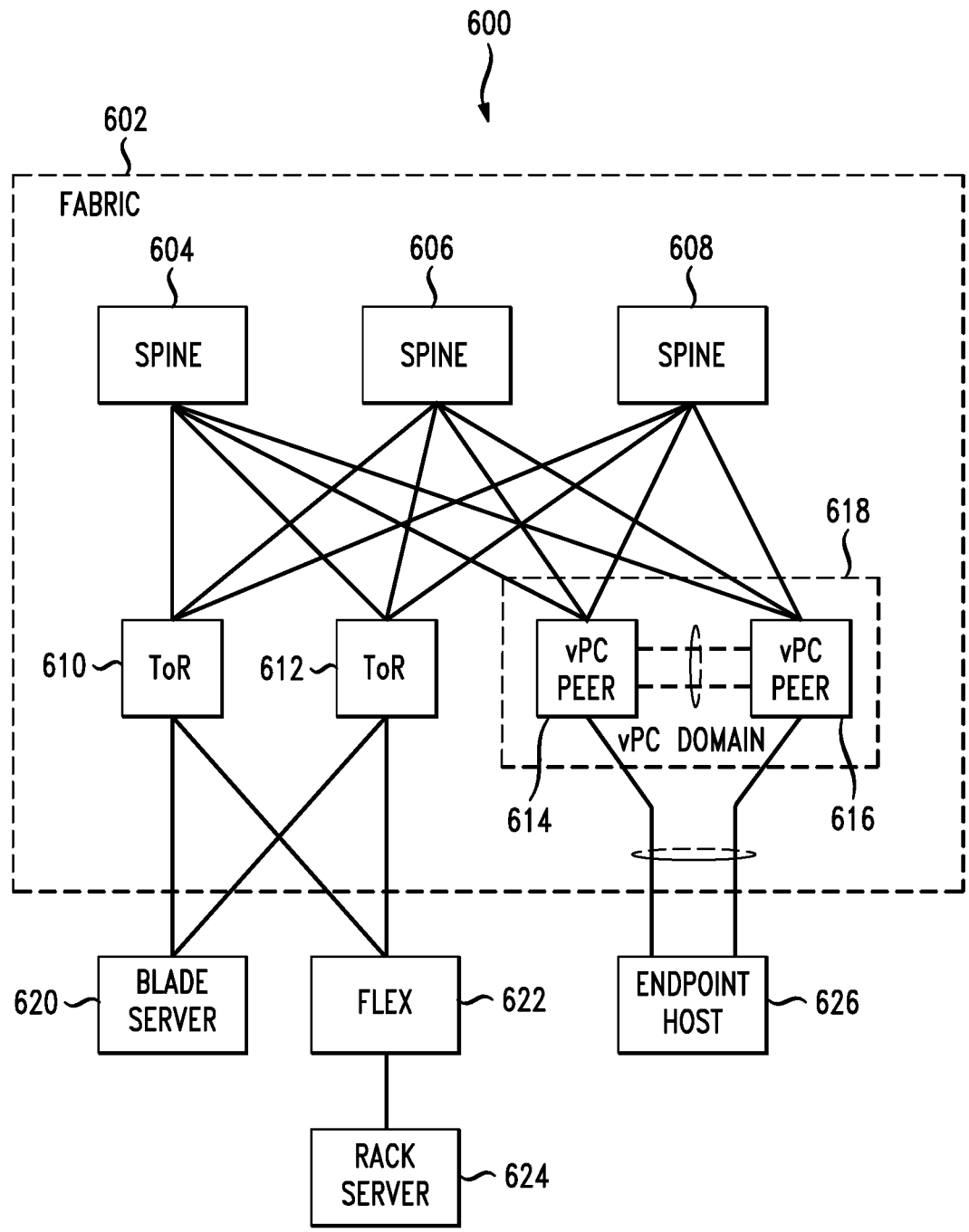
FIGS. 6A and 6B illustrate an example vPC deployment in a network fabric.

FIG. 6A illustrates example vPC deployment 600 in network fabric 602. Fabric 602 may consist of spine nodes (i.e., spine 604, spine 606, and spine 608) and leaf nodes (i.e., ToR 610, ToR 612, vPC peer 614, vPC peer 616). vPC peer 614 and vPC 616, in turn, may themselves be ToR's or switches. vPC peer 614 and vPC 616 may together form vPC domain 618. vPC peer 614 and vPC 616 can exchange control plane messages, keep-alive (heartbeat) messages, and other data through a physical or logical peer-link between them. Leaf nodes 610, 612, 614, 616 are connected to endpoints such as blade servers 620, fabric extender (FEX) 622, rack servers 624, and endpoint host 626.

Endpoint 626 can be connected to vPC peers 614, 616 through two or more physical links that are bundled by way of link aggregation, much the same way as similar devices were illustrated in FIGS. 5A-5B. vPC domain 618 can receive incoming packets, addressed to the associated VIP, from the rest of network fabric 602 and forward the packets to appropriate endpoint hosts, including endpoint host 626. Remote nodes such as spines 604, 606, 608 can route a packet, which originates from a remote endpoint (e.g., blade server 620, FLEX 622, rack server 624, etc.) and is addressed to the VIP, to either one of vPC peers 614, 616 depending on which peer is associated with a lower cost of reaching. Conversely, vPC domain 618 may receive outgoing packets from endpoint host 626 and other endpoints, and forward the packets to remote nodes in fabric 602. When forwarding incoming or outgoing packets, vPC domain 618 (i.e., vPC peer 614 and vPC peer 616) may encapsulate or de-encapsulate the packets to enable L2-L3 traversal. For example, a packet sent by a remote end host, such as blade server 620, FLEX 622, or rack server 624, to end host 626, which is behind vPC port 618, can be encapsulated within a VXLAN network, and the encapsulated packet may have the VIP address of vPC domain 618 as its destination in its VXLAN packet header. As such, the packet can be directed towards either of vPC switches 614, 616. The receiving switch (i.e., either vPC peer 614 or vPC peer 616) may then de-encapsulate the packet and forward it towards the recipient end host, such as endpoint 626, behind vPC port 618. Similarly, if endpoint 626 behind vPC port 618 sends a packet to some other end host, such as blade server 620, FLEX 622, or rack server 624, the packet can be encapsulated with a VXLAN header having the VIP address of vPC domain 618 as its source address of the outer VXLAN encapsulation header. The destination address can be either the physical TEP IP of the switch on which destination end point is attached or a VIP address of a vPC-switch pair if the destination is behind another vPC port.

Figure 6B:
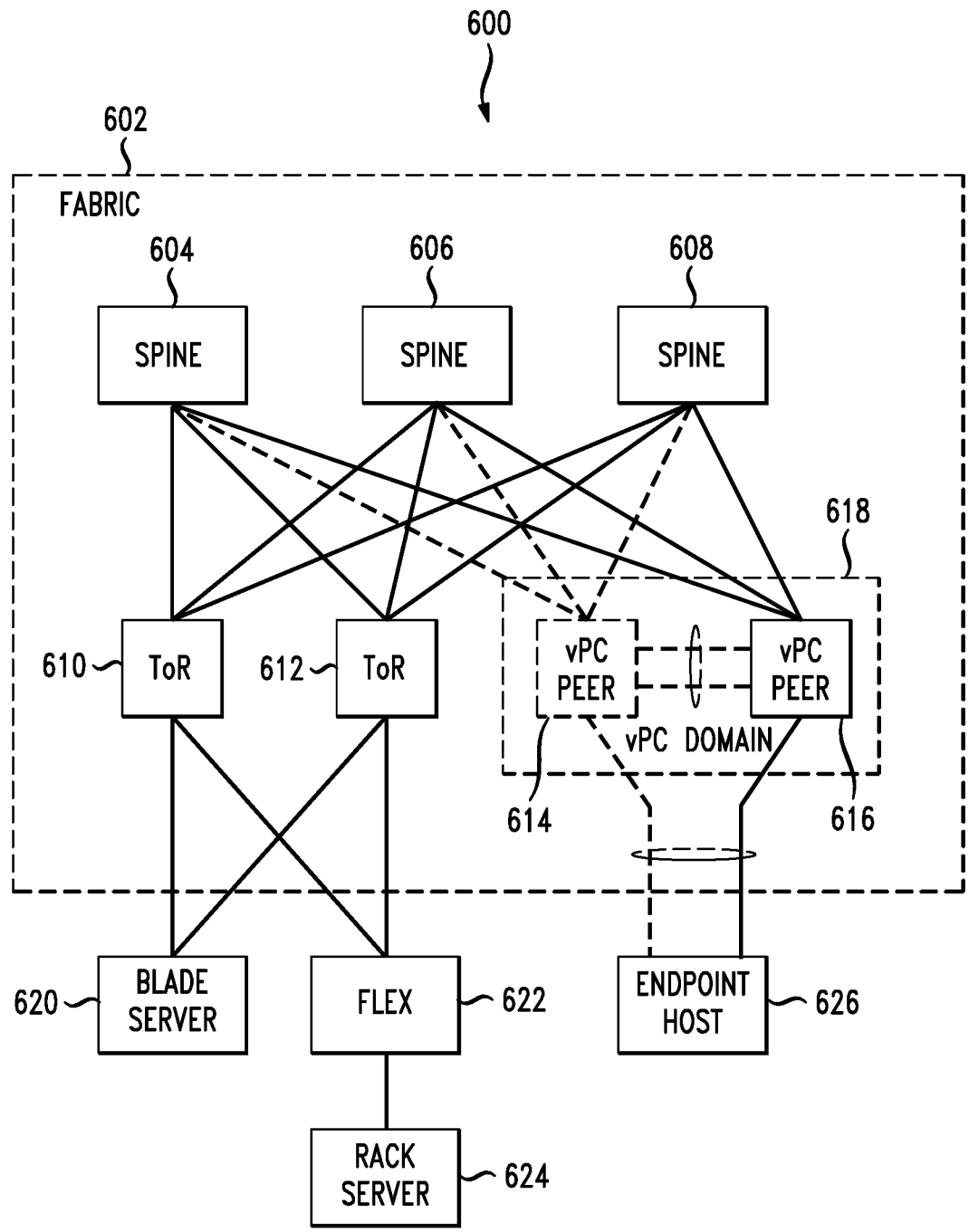

FIG. 6B illustrates an example vPC deployment in a network fabric upon vPC peer failure. Over the course of its operational life, one of the vPC peers, such as vPC peer 614, can fail. The failure in this context refers to the peer device's inability to appropriately route or switch data packets originating from spine nodes 604, 606, 608 or endpoint host 626. Such failure may be mechanical, electrical, electronic, or logical in nature. In certain aspects, failed vPC peer 614 may be simply overloaded and cannot take on additional workload. In other aspects, vPC peer 614 can be manually shut down on purpose, for example to service the device for maintenance or upgrade its hardware/software components. In some instances, failed vPC peer 614 may lose power and/or lose network connectivity. Regardless of the cause of its inoperability, vPC peer 614 may require rebooting to regain operability. In addition, its network elements may need to be brought up to function properly. During its downtime to regain operability, such as during the boot up time or bring up time, vPC peer 614 may not be able to handle incoming and outgoing traffic properly, thereby affecting the performance of vPC domain 618 as a whole.

Conventionally, surviving peer 616 would advertise a new address binding for its endpoint hosts. As such, vPC peer 616 would cut over to another IP address such as a physical TEP IP address for the endpoint servers including endpoint host 626, which had hitherto been advertised to be behind a VIP address associated with vPC domain 618. However, since it takes a finite amount of time to advertise the new binding to other leaf nodes such as ToR 610 and ToR 612, the nodes that have not been informed of the new binding may continue to send data packets to the VIP address. Consequently, these packets may get lost when some of them get routed to non-functioning vPC peer 614. Moreover, this problem may be compounded if vPC peer 616 is configured to send out the new binding advertisement only when it receives a packet from another node. In such a case, other network nodes such as ToR 610 and ToR 612 would learn of the new binding only when reverse traffic arrives from surviving vPC peer 616, which can prolong the time it takes to propagate the new binding information.

According to the improved method, however, in order to minimize the negative impact on any end nodes during the down time of vPC peer 614, surviving vPC peer 616 can take over as de facto owner of the VIP address such that all communication to and from end host 626 and other vPC end hosts can be handled solely by vPC peer 616. Thus, active vPC peer 616 can continue to advertise endpoint host 626 and any other endpoints associated with vPC domain 618 as if they are still behind the VIP address. As such, other leaf nodes such as ToR 610 and ToR 612 need not learn any new bindings. Any traffic originating from remote nodes (e.g., ToR 610, ToR 612) addressed to the VIP address can be delivered to surviving vPC peer 616. The infra network (i.e., overlay network) such as spines 604, 606, 608 can be configured to redirect all the traffic directed to vPC domain 618 to surviving vPC peer 616. For example, the infra routing protocol such as IS-IS is able to detect and converge to the failure of a vPC switch in the order of milliseconds. In other words, the entire overlay network can converge to the fact that the only viable path for reaching the VIP Address is towards surviving vPC switch 616. Thus, little or no traffic in the fabric-to-host direction may get ever lost during the transitional period in which vPC peer 614 is recovering from failure. Empirically, the infra routes have been observed to converge in order of 100 ms after the failure of vPC peer 614.

Meanwhile, endpoint host 626, which is attached to vPC domain 618, may learn of vPC peer's 614 failure. Endpoint 626 may either detect the failure on its own or be notified of the failure by surviving peer 616. Endpoint 626 can be configured to direct all the upstream traffic to vPC peer 616 instead of vPC peer 614.

When vPC peer 614 eventually boots up (i.e., reboots) and/or becomes online again, vPC peer 616 may detect that the link between two peers 614, 616 is now up. However, even though vPC peer 614 may be able to communicate with vPC peer 616, endpoint 626, and/or network fabric 602, vPC peer 614 may still not be ready to fully function as a vPC peer device yet. That is, vPC peer 614 may not have its internal states (e.g., switching and routing information, endpoint mapping, etc.) synchronized with vPC peer 616. Without having all the state information synced between the two vPC peers 614, 616, vPC domain 618 may not be able to properly function as one logical unit. As such, during this transitional period, recovering vPC peer 614 may take some measures to keep the data traffic away from it.

First, vPC peer 614 may artificially keep the cost of the VIP reachability for failed vPC peer 614 to an inflated value. The VIP reachability cost or VIP loopback reachability cost for vPC peer 614, in the context of this disclosure, may refer to a time and/or an amount of resource it takes for a remote node in the network to reach the VIP via vPC peer 614. vPC peer 614 and vPC peer 616 may each have a VIP reachability cost associated with them. The infra routing protocol such as IS-IS typically prefers the lowest-cost path to any prefix/node address. As such, the lower the reachability cost for a peer switch is, the more attractive the peer may appear, relative to the higher-cost peer, to remote nodes when accessing the VIP address. Conversely, by keeping a higher advertised cost/metric for the VIP address, the newly booting up switch, such as vPC peer 614, can ensure that the rest of infra network 602 will only consider vPC peer 616 as the lowest-cost path to reach the VIP address. The inflated value can be advertised to other nodes in the network such as ToR 610, ToR 612, and spines 604, 606, 608 such that the remote nodes will not direct any traffic addressed to the VIP to vPC peer 614. In the alternative, remote nodes may attempt to measure the reachability cost, for example by sending probes to vPC peer 614, and in response, vPC peer 614 can reply with the inflate value. The inflated value can be, for example, represented by the formula, $C+(MAX\_COST \div 2)$, where C is the original cost metric (i.e., what would have been the reachability cost value had the value not been inflated) and MAX_COST is the maximum cost value. However, one of skill in the art will understand that the inflated value may be calculated according to other formulas that can yield values that are sufficiently high to keep the incoming traffic to vPC domain 618 from being routed to inactive vPC peer 614. When the VIP loopback reachability is inflated, routing at the infra (i.e., overlay network) level would not prefer routes leading to vPC peer 614, and hence packets destined to the VIP may be forwarded to vPC peer 616, which is currently up and running. This allows recovering vPC peer 614 to have sufficient time to download all the vPC endpoint information from vPC peer 616 and program appropriate entries in its hardware without attracting any VIP-destined traffic until vPC peer 614 is ready to handle it.

Second, in order to tackle any outgoing traffic originating from the endpoint hosts towards fabric 602, vPC peer 614 can also artificially delay the link up time (i.e., vPC port bring up time) until vPC peer 614 has brought up all of its internal states (e.g., internal VLAN states on the vPC port) such that endpoint host 626 would not use the link to vPC peer 614 for forwarding the traffic. Alternatively or in conjunction, vPC peer 614 may revert to the proxy forwarding mode and forward any packets received from endpoint 626 to vPC peer 616 so that they can be handled by vPC peer 616. In the meantime, vPC peer 614 may continue to sync up information (e.g., remote endpoint bindings) from vPC peer 616 while spines 604, 606, 608 and endpoint 626 may be configured to associate the VIP address with vPC peer 616 only.

When vPC peer 614 determines that all end point sync is complete (i.e., all internal state information is synchronized with vPC peer 616) and thus vPC peer 614 is fully recovered, vPC peer 614 may bring up the link between vPC peer 614 and endpoint 626 such that endpoint 626 can start forwarding traffic to newly provisioned vPC peer 614. vPC peer 614 may then lower the inflated reachability cost to its original value or a newly measured cost value. vPC peer 614 may advertise the lowered cost value to remote nodes in fabric 602 so that some of the traffic destined for the VIP might start to flow towards vPC peer 614. By advertising the lowered cost only after bringing up the link to endpoint 626, vPC peer 614 can ensure that it can actually forward any incoming traffic to endpoint 626 when the traffic starts flowing in from the infra network.

Figure 7:
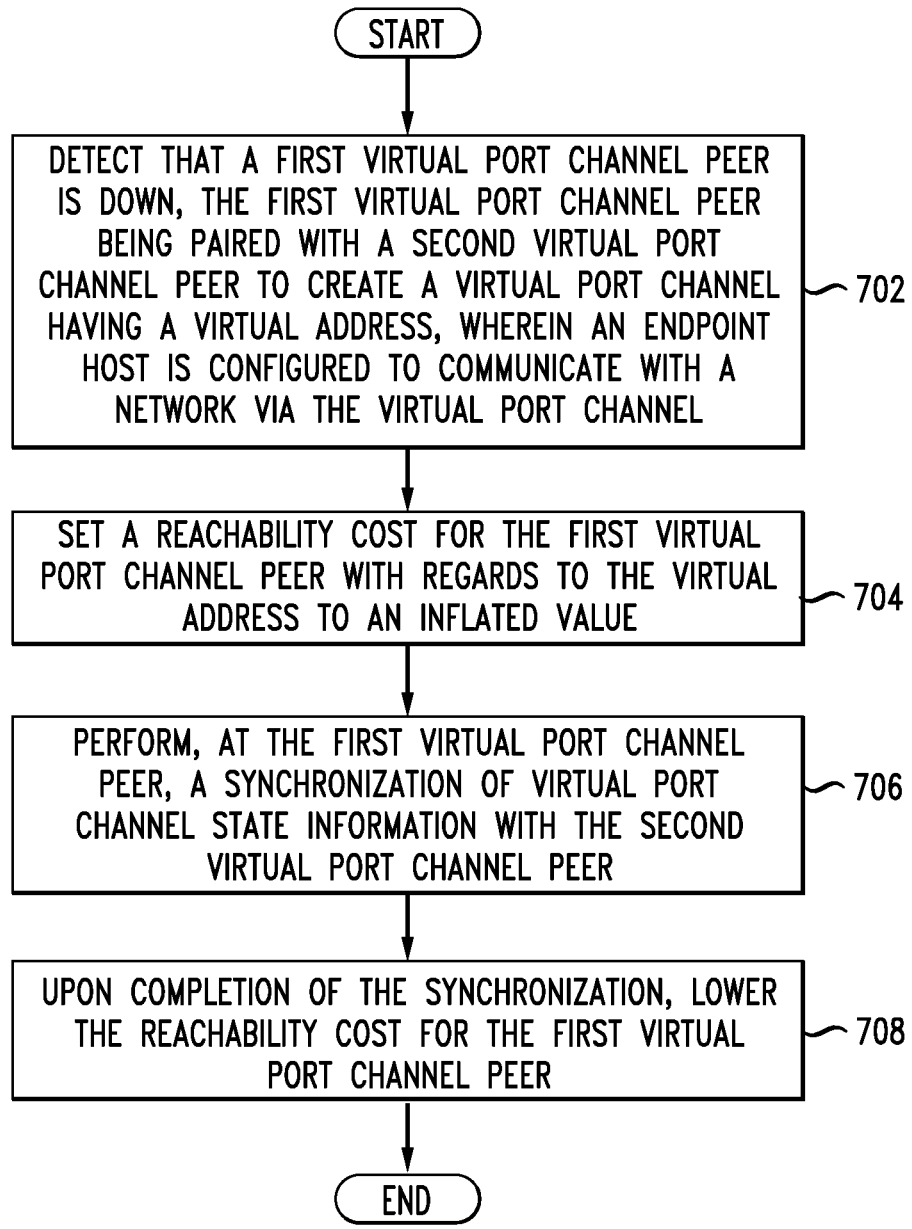
FIG. 7 illustrates an example method for inflating a reachability cost.
Figure 8:
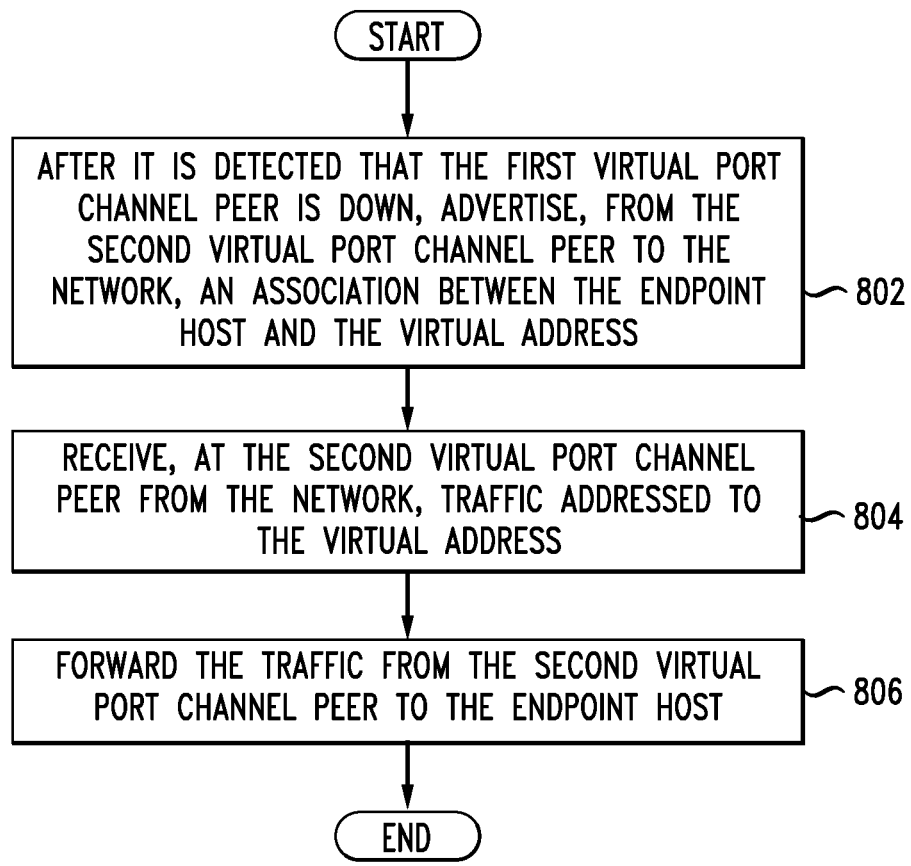
FIG. 8 illustrates an example method for advertising an association between the endpoint host and the virtual address.
Figure 9:
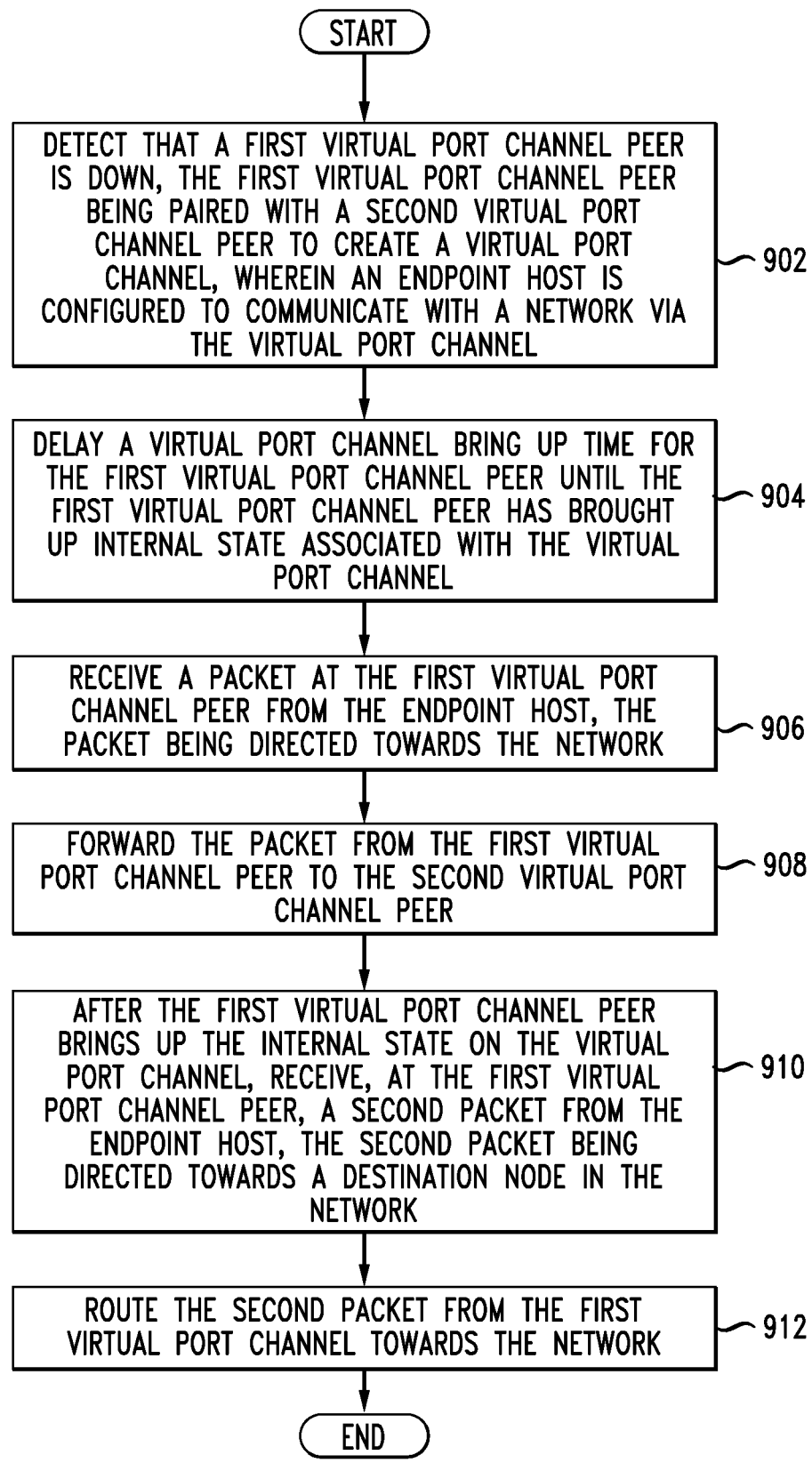
FIG. 9 illustrates an example method for delaying a virtual port channel bring up time.

Having disclosed some basic system components and concepts, the disclosure now turns to the example method embodiments shown in FIGS. 7-9. For the sake of clarity, the methods are described in terms of system 110, as shown in FIG. 1, configured to practice the method. Alternatively, the method may be implemented by system 200 as shown in FIG. 2A, system 250 as shown in FIG. 2B, any of the network nodes shown in FIG. 3, or any of the network nodes shown in FIG. 4. The steps outlined herein are exemplary and can be implemented in any combination thereof, including combinations that exclude, add, or modify certain steps.

FIG. 7 illustrates an example method for inflating a reachability cost. System 110 may detect that a first virtual port channel peer is down, the first virtual port channel peer being paired with a second virtual port channel peer to create a virtual port channel having a virtual address, wherein an endpoint host is configured to communicate with a network via the virtual port channel (702). The first virtual port channel peer and/or the second virtual port channel peer may be a switch. The virtual address can be a virtual Internet protocol (VIP) address. The first virtual port channel peer and the second virtual port channel peer may be leaf nodes and the network may consist of one or more spine nodes. The first virtual port channel peer being down may mean that a route, a link, a multi-chassis trunking (MCT) channel, or a virtual address loopback interface is down or inoperable. The MCT channel can be a link that connects the two vPC peers. The first virtual port channel peer being down may also imply a mechanical, electrical, electronic, or logical failure related to the first virtual port channel peer. In some cases, it may mean that the first virtual port channel peer is rebooting due to failure, maintenance, upgrade, etc.

The virtual port channel can be a virtual port channel domain having a virtual address such as a virtual IP address. The endpoint host may be connected to the first virtual port channel peer via a first physical link and the second virtual port channel peer via a second physical link. Thus, the virtual port channel may be configured to extend link aggregation, consisting of the first physical link and the second physical link, from the endpoint host to the first virtual port channel peer and the second virtual port channel peer. The endpoint host can be configured to send traffic to the second virtual port channel peer via the second physical link after it is detected that the first virtual port channel peer is down. System 110 may set a reachability cost for the first virtual port channel peer, with regards to the virtual address, to an inflated value (704). The inflated value, for example, can be equal to $C+(M \div 2)$, where C is a reachability cost metric and M is a maximum reachability cost. The reachability cost may be set to the inflated value after the first virtual port channel peer is rebooted. Routing for the network, especially infra-level routing for the network, can be configured to prefer to route a packet addressed to the virtual address to the second virtual port channel peer instead of to the first virtual port channel peer when the reachability cost for the first virtual port channel peer with regards to the virtual address is set to the inflated value.

System 110 may perform, at the first virtual port channel peer, a synchronization of virtual port channel state information with the second virtual port channel peer (706). The state information may consist of virtual port channel endpoint information, virtual local area network (VLAN) state information, and/or remote endpoint binding information. Upon completion of the synchronization, system 110 may lower the reachability cost for the first virtual port channel peer (708). For example, system 110 may set the reachability cost to the actual reachability cost as currently measured instead of the inflated value. This would allow remote network nodes such as spine nodes to start forwarding packets to the newly recovered first virtual port channel peer again.

FIG. 8 illustrates an example method for advertising an association between the endpoint host and the virtual address. After it is detected that the first virtual port channel peer is down, system 110 may advertise, from the second virtual port channel peer to remote nodes in the network, such as the spine nodes, an association between the endpoint host and the virtual address (802). The second virtual port channel peer does not necessarily have to cut over to its tunnel endpoint (TEP) Internet protocol (IP) address after the first virtual port channel peer is detected as being inactive. As such, the remote network nodes may still send packets destined to the endpoint host behind the virtual port channel to the virtual address (e.g., VIP address) instead of the second virtual port channel peer's TEP IP address. At the second virtual port channel peer from the network, system 110 may receive traffic addressed to the virtual address (804). System 110 may then forward the traffic from the second virtual port channel peer to the endpoint host (806). Forwarding the traffic to the endpoint host can be facilitated by looking up the switching table in the second virtual port channel peer. In the meantime, the surviving virtual port channel peer (i.e., second virtual port channel peer) can synchronize its internal state information such as switching/routing tables with the recovering virtual port channel peer (i.e., first virtual port channel peer).

FIG. 9 illustrates an example method for delaying a virtual port channel bring up time. System 110 may detect that a first virtual port channel peer is down, the first virtual port channel peer being paired with a second virtual port channel peer to create a virtual port channel, wherein an endpoint host is configured to communicate with a network via the virtual port channel (902). The first virtual port channel peer being down may mean that a route, a link, a multi-chassis trunking (MCT) channel, or a virtual address loopback interface is down or inoperable. The MCT channel can be a link that connects the two vPC peers. The first virtual port channel peer being down may also imply a mechanical, electrical, electronic, or logical failure related to the first virtual port channel peer. In some cases, it may mean that the first virtual port channel peer is rebooting due to failure, maintenance, upgrade, etc.

The endpoint host may be connected to the first virtual port channel peer via a first physical link, and the endpoint host may be connected to the second virtual port channel peer via a second physical link. System 110 may delay a virtual port channel bring up time for the first virtual port channel peer until the first virtual port channel peer has brought up internal state associated with the virtual port channel (904). The virtual port channel bring up time may be delayed after the first virtual port channel peer is rebooted. At this point, the first virtual port channel peer may be operational as a switch, but it may not be fully ready to function as a virtual port channel peer because its internal state has not been brought up yet. Bringing up the internal state associated with the virtual port channel may include obtaining, at the first virtual port channel peer, remote end point bindings from the second virtual port channel peer. Additionally, bringing up the internal state may also include synchronizing information pertaining to end points that are bound to various vPC ports on the second virtual port channel peer (i.e., which end point is connected to which vPC port). The first virtual port channel peer may also have to receive other information from the second virtual port channel peer, such as switching tables, routing tables, virtual port channel endpoint binding information, etc.

System 110 may receive a first packet at the first virtual port channel peer from the endpoint host, the packet being directed towards the network (906). The packet can be directed towards a remote node in the network fabric. System 110 may forward the first packet from the first virtual port channel peer to the second virtual port channel peer (908), if the first virtual port channel peer is not fully brought up yet. The second virtual port channel peer can be configured to route the first packet towards a destination node in the network. In some aspects, the endpoint host can be configured to forward outgoing traffic only to the surviving virtual port channel peer (i.e., second virtual port channel peer) once the endpoint host detects that the first virtual port channel peer is down and cannot handle traffic. After the first virtual port channel peer brings up the internal state on the virtual port channel, system 110 may receive, at the first virtual port channel peer, a second packet from the endpoint host, the second packet being directed towards the network (910). Now that the first virtual port channel peer is fully functional, system 110 may route the second packet from the first virtual port channel towards the network (912).

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

We claim:

1. A system comprising:
   a processor; and
   a non-transitory computer-readable storage medium storing instructions which, when executed by the processor, cause the processor to perform operations comprising:
      detecting that a first virtual port channel peer is down, the first virtual port channel peer being paired with a second virtual port channel peer to create a virtual port channel, wherein an endpoint host is configured to communicate with a network via the virtual port channel;
      delaying a virtual port channel bring up time for the first virtual port channel peer until the first virtual port channel peer has brought up internal state associated with the virtual port channel;
      receiving a packet at the first virtual port channel peer from the endpoint host, the packet being directed towards the network; and
      forwarding the packet from the first virtual port channel peer to the second virtual port channel peer.

2. The system of claim 1, wherein the virtual port channel bring up time is delayed after the first virtual port channel peer is rebooted.

3. The system of claim 1, wherein the second virtual port channel peer is configured to route the packet towards a destination node in the network.

4. The system of claim 1, wherein bringing up the internal state associated with the virtual port channel further comprises obtaining, at the first virtual port channel peer and from the second virtual port channel peer, one of remote endpoint binding information, routing information, or switching information.

5. The system of claim 1, wherein at least one of the first virtual port channel peer or the second virtual port channel peer is a switch.

6. The system of claim 1, wherein detecting that the first virtual port channel peer is down comprises detecting that one of a route, a link, a multi-chassis trunking (MCT) channel, or a virtual address loopback interface, associated with the first virtual port channel peer, is down.

7. The system of claim 1, wherein the endpoint host is connected to the first virtual port channel peer via a first physical link and the second virtual port channel peer via a second physical link, and wherein the virtual port channel is configured to extend link aggregation from the endpoint host to the first virtual port channel peer and the second virtual port channel peer via the first physical link and the second physical link.

8. The system of claim 7, wherein the endpoint host is configured to send traffic to the second virtual port channel peer via the second physical link after it is detected that the first virtual port channel peer is down.

9. The system of claim 1, wherein the first virtual port channel peer and the second virtual port channel peer are leaf nodes and the network comprises one or more spine nodes.

10. The system of claim 1, wherein the operations include:
    after it is detected that the first virtual port channel peer is down, advertising, from the second virtual port channel peer to the network, an association between the endpoint host and a virtual address;
    receiving, at the second virtual port channel peer from the network, traffic addressed to the virtual address; and
    forwarding the traffic from the second virtual port channel peer to the endpoint host.

11. The system of claim 1, wherein the second virtual port channel peer does not advertise to the network that the endpoint host is behind a tunnel endpoint (TEP) Internet protocol (IP) address of the second virtual port channel peer after it is detected that the first virtual port channel peer is down.

12. A non-transitory computer-readable storage device storing instructions which, when executed by one or more processors, cause the processors to perform operations comprising:
    detecting that a first virtual port channel peer is down, the first virtual port channel peer being paired with a second virtual port channel peer to create a virtual port channel having a virtual address, wherein an endpoint host is configured to communicate with a network via the virtual port channel; and
    after the first virtual port channel peer reboots and until virtual port channel state information at the first virtual port channel peer is synchronized with the second virtual port channel peer, performing at least one of:
       inflating a reachability cost for the first virtual port channel peer with regards to the virtual address; or
       delaying a virtual port channel bring up time for the first virtual port channel peer.

13. The non-transitory computer-readable storage device of claim 12, wherein the operations include:
    receiving a packet at the first virtual port channel peer from the endpoint host, the packet being directed towards a destination node in the network; and
    forwarding the packet from the first virtual port channel peer to the second virtual port channel peer.

14. The non-transitory computer-readable storage device of claim 12, wherein the operations include:
    after the virtual port channel state information at the first virtual port channel peer is synchronized with the second virtual port channel peer, performing at least one of:
       restoring the reachability cost to a current reachability cost for the first virtual port channel peer with regards to the virtual address; or
       bringing up a virtual port channel link associated with the first virtual port channel peer.

15. The non-transitory computer-readable storage device of claim 12, wherein at least one of the first virtual port channel peer or the second virtual port channel peer is a switch.

16. The non-transitory computer-readable storage device of claim 12, wherein detecting that the first virtual port channel peer is down comprises detecting that one of a route, a link, a multi-chassis trunking (MCT) channel, or a virtual address loopback interface, associated with the first virtual port channel peer, is down.

17. The non-transitory computer-readable storage device of claim 12, wherein the endpoint host is connected to the first virtual port channel peer via a first physical link and the second virtual port channel peer via a second physical link, and wherein the virtual port channel is configured to extend link aggregation from the endpoint host to the first virtual port channel peer and the second virtual port channel peer via the first physical link and the second physical link.

18. The non-transitory computer-readable storage device of claim 17, wherein the endpoint host is configured to send traffic to the second virtual port channel peer via the second physical link after it is detected that the first virtual port channel peer is down.

19. The non-transitory computer-readable storage device of claim 12, wherein the first virtual port channel peer and the second virtual port channel peer are leaf nodes and the network comprises one or more spine nodes.

20. The non-transitory computer-readable storage device of claim 12, wherein the operations include:
   after it is detected that the first virtual port channel peer is down, advertising, from the second virtual port channel peer to the network, an association between the endpoint host and the virtual address;
   receiving, at the second virtual port channel peer from the network, traffic addressed to the virtual address; and
   forwarding the traffic from the second virtual port channel peer to the endpoint host.

\* \* \* \* \*